Figure 1:
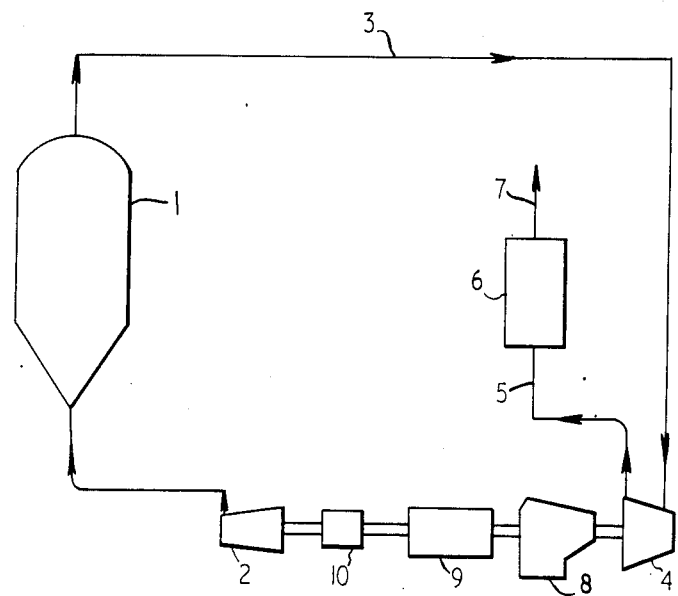

United States Patent [19]

Smith

[11] Patent Number: 4,677,821

[45] Date of Patent: Jul. 7, 1987

[54] PROCESS START-UP

[75] Inventor: Anthony P. Smith, Wilton, England

[73] Assignee: Imperial Chemical Industries PLC, London, England

[21] Appl. No.: 347,027

[22] Filed: Feb. 8, 1982

Related U.S. Application Data

[63] Continuation of Ser. No. 26,799, Apr. 3, 1979, abandoned.

[30] Foreign Application Priority Data

Apr. 13, 1978 [GB] United Kingdom ............... 14564/78
Feb. 12, 1979 [GB] United Kingdom ................. 7904905
Mar. 8, 1979 [GB] United Kingdom ................. 7908246

[51] Int. Cl.$^4$ ............................................. F02C 7/27
[52] U.S. Cl. .................................. 60/39.02; 60/39.07; 60/39.142
[58] Field of Search ................. 60/39.02, 39.07, 39.12, 60/39.14 M, 39.15, 39.18 B, 39.18 C, 39.46 G

[56] References Cited

U.S. PATENT DOCUMENTS 2,840,987  7/1958  Bloomberg et al. .......... 60/39.14 M
3,575,528  4/1971  Beam et al. ......................... 415/115
3,832,090  8/1974  Matto ................................. 415/115

FOREIGN PATENT DOCUMENTS 1136584 12/1968 United Kingdom .

Primary Examiner—Louis J. Casaregola
Attorney, Agent, or Firm—Cushman, Darby & Cushman

[57] ABSTRACT

Supplemental energy required during start-up of physical and chemical processes, for example fluid catalytic crackers, Velox boilers, is supplied by a gas turbine, for example an aircraft gas turbine, which can be uncoupled from the process once the process has become self-sustaining. The need for expensive additional drivers, for example large electric motors, which are conventionally used and which are fully used only at start-up is thereby largely or completely avoided.

3 Claims, 2 Drawing Figures

U.S. Patent    Jul. 7, 1987    4,677,821

PROCESS START-UP

This is a continuation of application Ser. No. 26,799 filed Apr. 3, 1979, now abandoned.

The present invention relates to improvements in processes requiring large amounts of heat on start-up.

Many physical and chemical processes require large amounts of energy for their efficient operation and as the provision of energy has become more and more expensive, so attempts have been made to use energy more and more efficiently and to conserve it wherever possible. Thus, for example, heat conservation is a feature of many chemical processes in which hot streams of solids and fluids are recycled for further use or treated, for example in heat exchangers, so as to recover heat from them for further use.

However, when many chemical and physical processes, for example fluid catalytic crackers, Velox boilers and boilers employing fluid flow beds of pulverised coal, are started up, there is a very large initial demand for energy. Many of these processes have power recovery facilities, for example turbines, but these can only become effective after the process has been established. Other means have to be used to provide the large amount of energy required initially. It is common practice, therefore, to put additional drivers into the compressors which are driven by the heat recovery turbines to provide a large proportion of the normal power for start-up purposes only.

One means of providing the additional drive is an electrical motor. The power required from this motor is very high initially but is much reduced once the heat recovery turbine becomes effective. Nevertheless, this means that the process operator has to pay a high maximum-demand tariff for this extra power compared with the tariff which he usually pays. Another adverse factor is that an expensive, large, external electrical system is needed for the electric motor although the need for the full capacity of such a system exists only for a short period of time i.e. during start-up of the process.

An alternative means of providing the additional drive is to use a steam turbine. However, waste heat facilities are not normally available at the start-up of a process and so additional steam generation capacity together with a condensation system needs to be provided if a steam turbine is to be used. Such an arrangement requires a high capital investment for a very small amount of actual running.

Proposals have been made to use a combination of steam turbine and electrical motor/generator drives but the combination still has the drawbacks of its individual components and, additionally, has the disadvantage that a combination of units will increase the complexity and cost of operations and adversely affect mechanical reliability.

We have now devised a system for start-up of heat-consuming processes which couples relatively low capital investment with lower running costs than have been achievable with earlier proposals.

Accordingly the present invention is an improvement to a heat-consuming physical or chemical process in which an extra source of energy is required at start-up to supplement the normal source of energy for the process, the improvement comprising using a gas turbine as the supplemental source of energy.

In preferred embodiments of the invention, the gas turbine is preferably of the aircraft type for example of the type commonly fitted to military aircraft. Preferably, the gas turbine is coupled through a power recovery unit, for example an expansion turbine, to one or more driven units, for example one or more compressors or pumps.

Optionally, a waste heat boiler is placed downstream of the power recovery unit and exhaust from the gas turbine is led into the boiler as soon as start-up of the process commences so that steam raising in the boiler can take place without delay.

Once the driven unit, for example a compressor or compressors, has been started up by the power recovery unit, the process to which heat is being supplied can be established and when the process exhaust gases for the power recovery unit have reached a sufficient temperature and pressure, they can be fed into the power recovery unit to gradually take over from the gas turbine. Until they reach a suitable temperature and pressure, the process exhaust gases can be blown-off to atmosphere through a silencer.

Once the process has become fully established and the need for supplemental energy for start-up has passed, the gas turbine can be taken off-line and, if desired, disconnected altogether in any conventional manner from the rest of the process equipment without interfering with the running of the process.

The improved process of this invention dispenses with the need for a very large additional driver, for example an electric motor, to meet the heavy load required at start-up of a heat-consuming process although it may still be convenient in many cases to incorporate a much smaller electric motor than has been the case hitherto as a power source for the normal running of the process.

Many processes employ expansion turbines as power recovery units which in turn drive compressors to provide some, at least, of the power required for the processes. In the method of this invention as applied to processes employing such compressor/turbine combinations, the gas turbine provided for start-up purposes is conveniently coupled to the expansion turbine by simple, easily disconnected means, for example ducting, which may be disconnected once the process has started and has become self-supporting. Processes employing compressor/expansion turbine combinations may encounter certain difficulties, for example temperature run-aways which may occur when the amount of fuel available for combustion upstream of the expansion turbine rises sharply due to some failure in control. Since, in some embodiments of the process of this invention, there may be no coupled electric motors, steam turbines etc, as conventionally used in process start-ups, the compressor/expansion turbine combination is free to find its own speed level, and may thereby be able to produce surplus output from the compressor as more energy is available to the expansion turbine.

According to a further aspect of the present invention therefore a method for controlling a temperature run-away in a process employing a combination of a compressor and expansion turbine with a gas turbine used as as supplemental source of energy comprises setting the speed control for the expansion turbine at a higher maximum limit than that for normal operation of the turbine and employing at least a part of the additional output of air from the compressor produced as a consequence of a temperature run-away as coolant for equipment used in the process. This aspect of the present invention finds particular application in fluid catalytic cracking processes in which a process upset may cause a temperature run-away in, for example, the regenerator or the furnace bed of the cracking process. In the absence the of the conventional additional drivers provided especially for start-up purposes, the greater flexibility thereby provided by the method of this invention allows a temperature run-away to be dealt with readily and at relatively low cost. In this embodiment of the present invention we have found that by suitable design of the expansion turbine and its associated equipment it is possible to allow the speed of the expansion turbine rather more "freedom" than has been the case hitherto so that in a temperature run-away, extra air generated by the compressor associated with the turbine can be used as a coolant.

The additional coolant air can be used either separately or, preferably, in combination with conventional cool steam facilities to form a cool boundary layer over critical pieces of equipment affected by a temperature run-away, for example dust disentrainment cyclones, expansion turbine discs and blades.

A further difficulty which may arise in processes which employ a compressor/expansion turbine combination is that after the process has been established conditions arise in which the amount of energy released to the gas going to the expander turbine is insufficient to sustain operation of the process. in conventional processes, the additional driver(s) can be used to increase the amount of energy until the process becomes self-sustaining again. We have found that the lack of an additional driver in the method of this invention need not hinder operation of the process should it become non-self-sustaining. Simple and relatively unexpensive means can be provided to assist the process to return to its self-sustaining state.

Accordingly, a further aspect of the present invention is a method for sustaining operation of a physical or chemical process which employs a compressor/expansion turbine combination with a gas turbine used as a supplemental source of energy, which method comprises passing a stream, of surplus combustion air into a burner, heating the stream of combustion air in the burner, mixing the stream of heated combustion air from the burner with a main gas stream from the said process to form a combined gas stream and passing the combined gas stream to the expansion turbine, the temperature of the stream of heated combustion air from the burner being such that the temperature of the combined gas stream is raised to a sufficiently high level to sustain the physical or chemical process.

Preferably some or all of the surplus combustion air comes from the compressor of the compressor/expansion turbine combination but if desired some or all of the surplus combustion air can be supplied from an alternative source, for example a stand-by compressor.

This embodiment of the present invention finds application in circumstances where operation of a physical or chemical process becomes a non-self-sustaining and in such circumstances it enables the expansion turbine, and thereby the whole process, to be "re-energised" using heated combustion air which, because of the run-down in the process, has become surplus to requirements. If necessary, the surplus combustion air can be supplemented with air from a secondary supply.

Preferably, the stream of heated combustion air from the burner enters the main gas stream through a nozzle at the throat of a venturi or similar device, thereby raising the pressure of the combined gas stream as well as its temperature.

The process of the present invention is applicable in many processes, for example systems which have thermal recovery units which are used to drive compressors or pumps, fluid-bed catalytic crackers, Velox boilers and boilers of other kinds, for example those employing combustion beds of fluidised solids, for example pulverised coal.

The Applicants believe that the process of this invention will have particular applicability in the start-up of fluid-bed catalytic crackers which are well known to make a heavy initial demand on energy.

The present invention also includes apparatus for supplementing the energy required by a heat-consuming physical or chemical process during its start-up comprising in combination a gas turbine coupled through a power recovery unit to a driven unit, for example a compressor or pump.

Optionally, the apparatus further includes a burner for heating combustion air located between the power recovery unit, for example an expansion turbine, and the driven unit and in a position enabling the flow of combustion air through the burner to by-pass the reactor for the heat-consuming process.

The process and apparatus of the present invention allow supplemental energy to be supplied to a process at low capital cost and at low running cost. Connections between the gas turbine and the power recovery unit and the driven unit(s) can be effected by simple ducting which is easily disconnected when the gas turbine is no longer required. Moreover, the simplified method of operation allows steam generation using gases exhausted from the expansion turbine to start at a very early point in the cycle.

Figure 2:
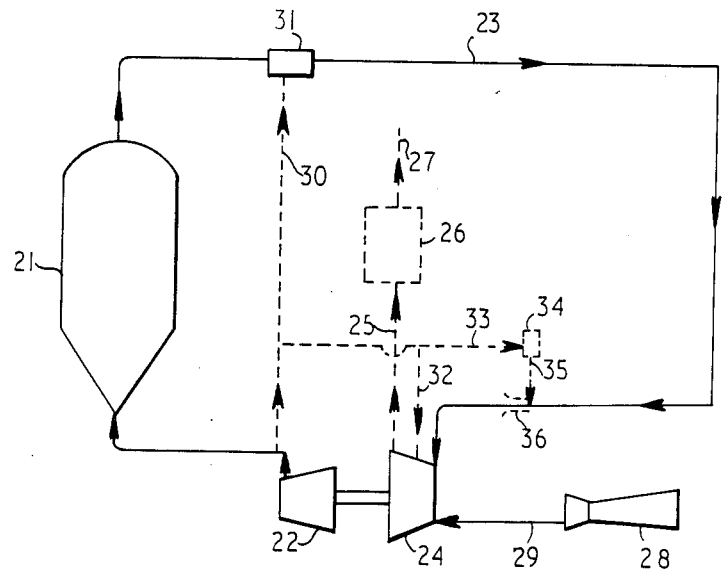

The invention will now be further described with reference to the drawings in which FIG. 1 is a line diagram of a prior art process cycle not forming part of the present invention, FIG. 2 is a line diagram of a process cycle using the process and apparatus of the present invention.

Referring to FIG. 1, heat is supplied to a catalyst regenerator 1 from an air compressor 2. Waste gases from the regenerator 1 are recycled through line 3 to a hot-gas expander 4 whence a portion of the gases is diverted along line 5 to a waste heat boiler 6. After use in boiler 6, the remaining gases are passed along line 7 to a stack (not shown). A second portion of gases from the hot-gas expander 4 are passed thrugh a steam turbine 8, optionally fitted with a condenser. An electric motor 9 is provided to drive the compressor and, because of differing speed requirements which may occur between the components of the system, a gear unit 10 is optionally provided. During start-up of the catalyst regeneration process, a heavy, expensive, load is placed on the electric motor 9 until the process has become established.

Referring to FIG. 2 (in which optional features are indicated by dotted lines), heat is supplied to catalyst regenerator 21 from an air compressor 22. Waste gases from the regenerator 21 are recycled through line 23 to a hot-gas expander 24 and then, optionally, along line 25 to waste heat boiler 26. After use in boiler 26, the remaining gases are passed along line 27 to a stack (not shown). Any gas not used in the waste heat boiler 26 is passed to a stack (not shown).

An aircraft-type gas turbine 28 is provided for start-up of the process and is connected via ducting to the hot-gas expander 24. Once the regeneration process has become established, the ducting 29 from gas turbine 28 to the expander 24 is blanked off and the turbine taken out of service. The use of the gas turbine simplifies the equipment required and reduces both capital and running costs of the catalyst regeneration process.

Optionally, the discharge from air compressor 22 can be used to serve one or both of two possible additional functions, which cannot occur simultaneously. In the first, a line 30 is taken from the air compressor 22 to a dust removal devices, for example cyclones 31 which are a normal feature fitted downstream from catalyst regenerator 21. When a process upset causes excessive gas temperatures at the outlet of regenerator 21, the relatively cool gas from compressor 22 is admitted, with or without cooling steam, to the devices 31; at the same time, if desired, cool gas can also be passed through line 32 to the expansion turbine 24 to protect temperature-sensitive components there, as is conventional per see in turbines. The second additional function for surplus air from compressor 22 may occur if combustion in regenerator 21 is insufficient to provide the energy required by expansion turbine 24 to maintain the process. In this case, the surplus air is led along line 33 to a burner 34 and the heated air is fed from the burner along line 35 to line 23 and thence to the expansion turbine 24. Heating of the air in burner 34 is controlled so that the mixture of gases entering the turbine 24 is at a sufficiently high temperature to bring about "re-energising" of the process. If desired, at the entry to line 23, the gas from burner 34 may enter at the throat of a venturi 36 or other injection device, thereby raising the pressure at entry to expansion turbine 24.

I claim:

1. A start-up process for a chemical processing plant including at least one compressor, and heat recovery turbine, the start-up process comprising the steps:
   providing ducting means for receiving exhaust from a gas turbine engine and directing same into the heat recovery turbine;
   physically and operatively engaging the gas turbine engine through the ducting means to the heat recovery turbine;
   operating the gas turbine engine so that exhaust therefrom provides start-up energy to the heat recovery engine;
   physically and operatively disengaging the gas turbine engine from the heat recovery turbine once said chemical processing plant becomes self-sustaining; and
   utilizing a burner supplied with air from the compressor,
   said process further comprising the step of selectively introducing additional heated air from the burner into the heat recovery turbine so that the additional heated air supplements said exhaust from said gas turbine engine to provide sufficient start-up energy.

2. A start-up process as claimed in claim 1, said process further comprising the step of introducing cooling air frm the compressor to temperature-sensitive components of said heat recovery turbine so that said components are protected from the temperature of said exhaust of said gas turbine engine during start-up, and so that the power available from the heat recovery turbine is boosted.

3. A start-up process for a chemcial processing plant including at least one compressor, and heat recovery turbine, and a burner supplied with air from the compressor, the start-up process comprising the steps of:
   providing ducting means for receiving exhaust from a gas turbine engine and directing same into the heat recovery turbine;
   physically and operatively engaging the gas turbine through the ducting means to the heat recovery turbine;
   operating the gas turbine engine so that exhaust therefrom provides start-up energy to the heat recovery engine; and
   selectively introducing additional heat air from the burner into the heat recovery turbine so that the additional heated air supplements the exhaust from the gas turbine engine to provide sufficient start-up energy.

* * * * *